April 10, 1945.  A. TOWNHILL  2,373,518

BAND CONTROLLED PISTON

Filed July 2, 1943

Inventor
ARTHUR TOWNHILL
by Charles Stills Attys.

Patented Apr. 10, 1945

2,373,518

UNITED STATES PATENT OFFICE 2,373,518

BAND CONTROLLED PISTON

Arthur Townhill, Cleveland, Ohio, assignor to Thompson Products, Inc., Cleveland, Ohio, a corporation of Ohio Application July 2, 1943, Serial No. 493,196

5 Claims. (Cl. 309—13)

This invention relates to pistons having metal bands, hoops or rings of lower thermal expansion than the piston metal for controlling the expansion of the piston skirt from the piston head.

Specifically, the invention relates to a piston having a head with a ring flange, an integral skirt carrying pin bosses and having a slot therein between the pin bosses wherein a metal ring of lower thermal expansion than the piston is embedded in the piston circumferentially thereof or around the axis thereof with one portion passing through the head and another portion passing through the skirt to bridge the slot for offsetting the expansion of the unslotted side of the skirt by pulling on the slotted side when the head expands and pulls on the ring.

According to this invention the expansion of piston skirts is controlled by piston heads through metal rings, bands or hoops embedded in the piston peripherally thereof and having a portion passing through the head and through the skirt. Since the head is the hottest portion of the piston in operation it will expand and pull on the ring. The ring in turn pulls the skirt to offset radial expansion of the skirt and converts the radial expansion into circumferential expansion for closing up a slot or gap provided in the skirt.

The ring by being embedded in the piston around the axis thereof or peripherally of the piston causes no interference and leaves ample room in the piston for the connecting rod. The ring preferably crosses the pin bosses adjacent the wrist pin holes of these bosses so that the pin holes can be close to the lowest piston ring. Low compression height is thus possible and no ribs are used that will give connecting rod interference in the piston.

The bands, rings or hoops can be made of ferrous metal such as steel while the pistons are made of metals having a higher coefficient of expansion such as, for example, aluminum. The aluminum piston can be cast around the ferrous metal ring.

The piston of this invention prefer..bly has a skirt joined to the head in the regions of the pin bosses and separated from the head in regions at right angles to the pin bosses thereby providing a flexible skirt. In addition the skirt is slotted between the pin bosses at least on one side thereof to provide a gap which is bridged by the ring.

It is then an object of this invention to control the expansion of a piston skirt from the head of the piston.

A further object of the invention is to provide pistons with continuous metal rings partially embedded in the piston heads and partially embedded in the piston skirts for controlling expansion of the skirts from the heads.

A further object of the invention is to provide a piston having a head with a ring flange and an integral skirt carrying pin bosses and slotted between the pin bosses wherein a continuous metal ring of lower thermal expansion than the piston is embedded in the piston around the axis thereof to pass partially through the head and through the slotted portion of the skirt.

A further object of the invention is to provide aluminum pistons with ferrous metal rings embedded circumferentially therein and inclined to pass through the head and the skirt portions thereof.

A still further object of the invention is to provide a band controlled piston wherein radial expansion of the skirt is converted into circumferential expansion and is controlled by expansion of the head of the piston.

Other and further objects of the invention will be apparent to those skilled in the art from the following detailed description of the annexed sheet of drawings which, by way of preferred example only illustrates one embodiment of the invention.

Figure 1:
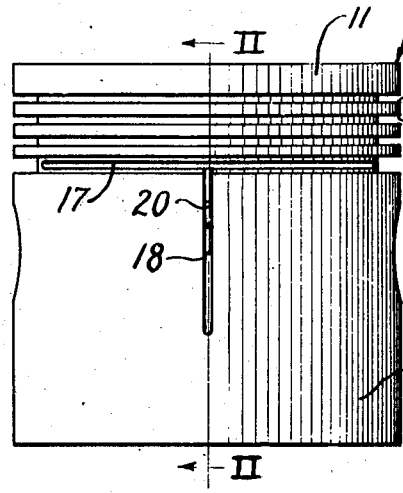
Figure 1 is a side elevational view of a piston according to this invention.
Figure 2:
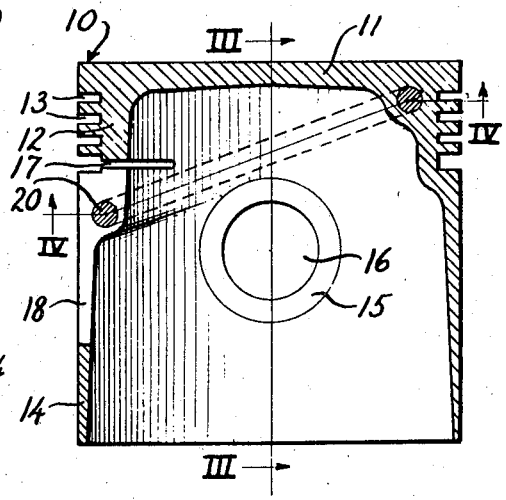
Figure 2 is an axial cross-sectional view taken along the line II—II of Figure 1.
Figure 3:
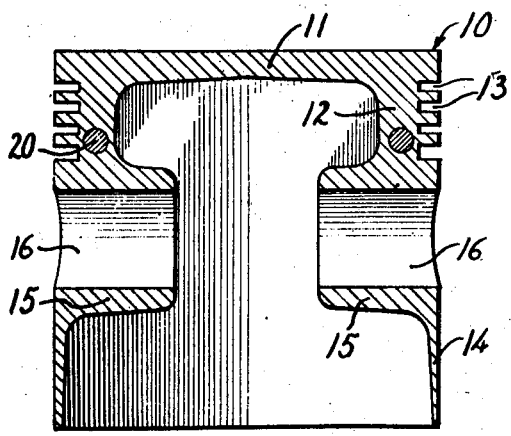
Figure 3 is an axial cross-sectional view taken along the line III—III of Figure 2.
Figure 4:
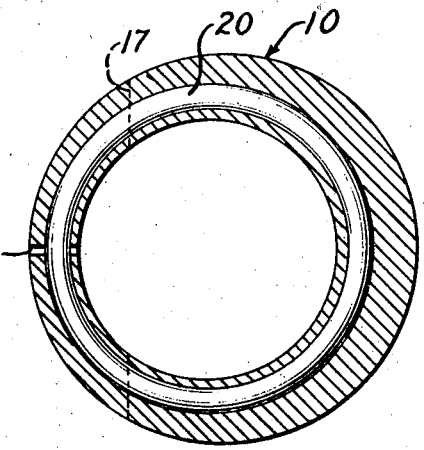
Figure 4 is a transverse cross-sectional view, with a part in elevation, taken along the line IV—IV of Figure 2.

In Figures 1 to 4, inclusive, the reference numeral 10 designates generally a piston according to this invention having a head 11 with an integral ring flange 12 equipped with peripheral grooves 13 for receiving piston rings (not shown). The head 11 has a hollow skirt 14 integral therewith and depending from the ring flange 12 thereof. This skirt 14 carries piston pin bosses 15 on diametrically opposite sides thereof providing wrist pin or piston pin holes 16 closely adjacent the bottom ring groove 13 of the head.

The skirt 14 is separated from the ring flange 12 in the region thereof between the pin bosses 15 at least one one side of the piston by means of a slot 17. This slot 17 extends circumferentially around the piston for sufficient distance to give flexibility to the skirt.

A vertical slot 18 is provided in the skirt 14 which bisects the slot 17. The slot 18 is adapted to be opened up and closed during expansion and contraction of the skirt.

In accordance with this invention a continuous ring, band or hoop 20 composed of metal having a lower thermal coefficient of expansion than the material of the piston head and skirt is embedded in the piston circumferentially thereof or around the axis thereof. The ring 20 passes through one side of the head flange 12 and through the opposite side of the skirt 14 to bridge the slot 18. The ring is thus inclined relative to the axis of the piston and passes closely adjacent the pin holes 16 allowing these pin holes to be very close to the lowest ring groove 13. The ring is of sufficiently large diameter so that it gives no interference to the connecting rod inserted in the piston.

No ribs are necessary in the piston for receiving the ring.

The piston is preferably composed of aluminum while the ring is preferably composed of a ferrous metal such as steel having an appreciably lower thermal coefficient of expansion than the aluminum.

In operation, the head 11 of the piston and its dependent ring flange 12 is the hottest part of the piston and expands the most. The unslotted side of the piston skirt will also expand radially but this expansion is controlled through the ring 20 which pulls on the slotted side of the piston since it does not expand as much as the piston head thereby offsetting the expansion of the unslotted side of the skirt and converting the radial skirt expansion into circumferential expansion.

From the above description it should be understood that this invention now provides band controlled pistons wherein the expansion of piston skirts is controlled from the heads of the pistons.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A piston comprising a piston head, a slotted skirt depending therefrom, and a ring embedded in the piston peripherally thereof passing through the slotted portion of the skirt into the head for controlling expansion of the skirt from the head.

2. A piston comprising a piston head, a slotted piston skirt depending therefrom, and an inclined hoop embedded in the piston around the axis thereof having portions in the skirt and head, said hoop being effective for controlling expansion of the skirt from the head.

3. A piston comprising a piston head having an integral depending ring flange, a piston skirt carrying pin bosses, said ring flange and piston skirt being separated in a region between the pin bosses and said skirt having a slot communicating with the separated area between the ring flange and skirt, and a metal ring of lower thermal coefficient of expansion than the said piston embedded in the piston peripherally thereof having portions passing through the piston head and through the piston skirt with said portion passing through the piston skirt bridging said slot to control expansion of the skirt from the head.

4. A piston comprising a one-piece aluminum hollow member having a head and a pin boss carrying skirt joined to the head in the region of the pin bosses and separated from the head between the pin bosses, said skirt having a slot therein communicating with the area of separation between the head and skirt, and a ferrous metal band embedded in said piston around the axis thereof having portions passing through said head and through said skirt with the portion passing through said skirt bridging said slot.

5. A piston having a head portion with a depending ring flange and an integral skirt portion carrying pin bosses, said skirt having a slot therein between said pin bosses, and a metal ring of lower thermal expansion than said piston embedded in the piston peripherally thereof and inclined relative to the axis of the piston to pass through the slotted portion of the skirt and said ring flange in the head for controlling expansion of the skirt from the head.

ARTHUR TOWNHILL.